(12) United States Patent
Baer et al.

(10) Patent No.: US 7,563,381 B2
(45) Date of Patent: *Jul. 21, 2009

(54) HIGH MILLING RESISTANCE WRITE POLE FABRICATION METHOD FOR PERPENDICULAR RECORDING

(75) Inventors: Amanda Baer, Campbell, CA (US); Quang Le, San Jose, CA (US); Kim Lee, Fremont, CA (US); Aron Pentek, San Jose, CA (US); Douglas J. Werner, Fremont, CA (US); Sue S. Zhang, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 170 days.

This patent is subject to a terminal disclaimer.

(21) Appl. No.: 10/836,867

(22) Filed: Apr. 30, 2004

(65) Prior Publication Data

US 2005/0241140 A1 Nov. 3, 2005

(51) Int. Cl.
*G11B 5/187* (2006.01)
(52) U.S. Cl. .................. 216/22; 29/603.01; 29/603.13; 360/122
(58) Field of Classification Search ........................ None
See application file for complete search history.

(56) References Cited

U.S. PATENT DOCUMENTS

| | | | | |
|---|---|---|---|---|
| 5,246,884 | A | 9/1993 | Jaso et al. | 437/225 |
| 6,238,582 | B1 | 5/2001 | Williams et al. | 216/22 |
| 6,664,026 | B2 | 12/2003 | Nguyen et al. | 430/311 |
| 2002/0036873 | A1 | 3/2002 | Hara et al. | 360/321 |
| 2002/0146851 | A1* | 10/2002 | Okazawa et al. | 438/3 |
| 2003/0193759 | A1 | 10/2003 | Hayashi et al. | 360/324.1 |
| 2004/0027730 | A1 | 2/2004 | Lille et al. | 360/322 |
| 2005/0024779 | A1* | 2/2005 | Le et al. | 360/317 |
| 2005/0051820 | A1* | 3/2005 | Stojakovic et al. | 257/295 |
| 2005/0068665 | A1* | 3/2005 | Le et al. | 360/97.01 |
| 2005/0185338 | A1* | 8/2005 | Hsiao et al. | 360/126 |
| 2006/0002019 | A1* | 1/2006 | Guthrie et al. | 360/125 |
| 2006/0028762 | A1* | 2/2006 | Gao et al. | 360/125 |

FOREIGN PATENT DOCUMENTS

| | | |
|---|---|---|
| JP | 2000-173987 | 6/2000 |
| JP | 2002-100011 | 4/2002 |

* cited by examiner

*Primary Examiner*—Allan Olsen
(74) *Attorney, Agent, or Firm*—Zilka-Kotab, PC

(57) ABSTRACT

A method for constructing a tapered write pole, the method including the use of a bilayer hard mask.

19 Claims, 11 Drawing Sheets

HIGH MILLING RESISTANCE WRITE POLE FABRICATION METHOD FOR PERPENDICULAR RECORDING

FIELD OF THE INVENTION

The present invention relates to perpendicular magnetic recording, and more particularly to a method for forming a tapered write pole for a perpendicular write head.

BACKGROUND OF THE INVENTION

At the heart of a computer is a magnetic disk drive that includes a magnetic disk, a slider where a magnetic head assembly including write and read heads is mounted, a suspension arm, and an actuator arm. When the magnetic disk rotates, air adjacent to the disk surface moves with it. This allows the slider to fly on an extremely thin cushion of air, generally referred to as an air bearing. When the slider flies on the air bearing, the actuator arm swings the suspension arm to place the magnetic head assembly over selected circular tracks on the rotating magnetic disk, where signal fields are written and read by the write and read heads, respectively. The write and read heads are connected to processing circuitry that operates according to a computer program to implement write and read functions.

Typically magnetic disk drives have been longitudinal magnetic recording systems, wherein magnetic data is recorded as magnetic transitions formed longitudinally on a disk surface. The surface of the disk is magnetized in a direction along a track of data and then switched to the opposite direction, both directions being parallel with the surface of the disk and parallel with the direction of the data track.

Data density requirements are fast approaching the physical limits, however. For example, increased data capacity requires decreased bit sizes, which in turn requires decreasing the grain size of the magnetic medium. As this grain size shrinks, the magnetic field required to write a bit of data increases proportionally. The ability to produce a magnetic field strong enough to write a bit of data using conventional longitudinal write head technologies is reaching its physical limit.

One means for overcoming this physical limit has been to introduce perpendicular recording. In a perpendicular recording system, bits of data are recorded magnetically perpendicular to the plane of the surface of the disk. The magnetic disk may have a relatively high coercivity material at its surface and a relatively low coercivity material just beneath the surface. A write pole having a small cross section and very high flux emits a strong, concentrated magnetic field perpendicular to the surface of the disk. This magnetic field emitted from the write pole is sufficiently strong to overcome the high coercivity of the surface material and magnetize it in a direction perpendicular to its surface. This flux then flows through the relatively magnetically soft underlayer and returns to the surface of the disk at a location adjacent a return pole of the write element. The return pole of the write element has a cross section that is much larger than that of the write pole so that the flux through the disk at the location of the return pole (as well as the resulting magnetic field between the disk and return pole) is sufficiently spread out to render the flux too week to overcome the coercivity of the disk surface material. In this way, the magnetization imparted by the write pole is not erased by the return pole.

Efforts to minimize track width and bit size when using perpendicular recording have focused on the formation of the write pole since the write pole defines both the track width and the bit size. Most desirably, the write pole should have a trapezoidal, or tapered shape in order to prevent adjacent track writing problems associated with skew. As those skilled in the art will recognize, skew occurs as an actuator arm swings the magnetic head to either extreme of its pivot range (ie. at the inner and outer portions of the disk). Such skew positions the head at an angle, which positions portions of the write pole outside of the desired track. Forming the write pole with a trapezoidal shape reduces such adjacent track writing.

Another attempt to improve write pole performance has focused on reducing remnance. Remnance is the slower than desired magnetization decay when the write current is turned off. Because a large amount of flux is being forced into a relatively small write pole, when the write current is turned off the magnetization of the write pole does not immediately cease, but continues for an undesirably long period of time. An approach to alleviate this has been to form the write pole as laminations of magnetic layers having very thin layers of non-magnetic material disposed therebetween.

Efforts to form the desired trapezoidal, laminated write poles have involved forming laminated layers of high Bsat magnetic material and then depositing a hard mask and a photoresist patterning mask. A material removal process such as reactive ion etch (RIE) has then been used, with the photoresist as a mask, to pattern the hard mask. Ion milling has then been used to remove the magnetic material there under. An angled ion milling process has then been used to form the desired tapered shape of the write pole.

A problem that has been encountered with the above, however, is that due to poor RIE selectivity between the hard mask and the photoresist mask layer, the photoresist mask layer must be made very thick. This is because a large amount of the photoresist must be consumed in the patterning of the hard mask. As increased data densities require smaller track widths, the tall photoresist structure becomes problematic. For example it would be desirable to use deep ultraviolet (deep U.V.) photolithography or e-beam photolithography, because these processes provide high resolution and allow a well defined small track width write pole to be constructed. However, in general, thicker resist degrades resolution due to worsening aerial imaging in the case of deep UV lithography, and increased blurring due to forward scattering in the case of e-beam lithography. In addition, since the aspect ratio (height to width) of a photoresist mask is limited by physical capabilities of the material, as track widths decrease the thickness must likewise decrease.

Therefore, there is a need for a process for forming a write pole of a perpendicular write head wherein the photoresist mask thickness (height) can be reduced while still achieving desired patterning of an underlying hard mask structure. Such a process would preferably allow the use of deep U.V. or e-beam photolithography and would allow the write head to be formed with a very narrow track width.

SUMMARY OF THE INVENTION

The present invention provides for constructing a well defined, narrow trackwidth write pole for use in a perpendicular magnetic write head. A magnetic layer is deposited, followed by first and second hard masks. A photoresist mask is then formed over the hard mask structure, and configured to define a trackwidth of the write pole. A first material removal process is performed to pattern the photoresist mask into the second hard mask by removing portions of the second hard mask that are not covered by the photoresist mask. A second material removal process is then performed to pattern the second hard mask into the first hard mask by removing portions of the first hard mask that are not covered by the second hard mask.

The second hard mask may be constructed of a material that will be more readily removed by the first material removal process than the photoresist mask will. The first hard mask may be constructed of a material to be more readily removed by the second material removal process than the second hard mask. Thereafter, a third material removal process may be performed to pattern the magnetic material to form the write pole by removing portions of the magnetic material not covered by the hard masks and photoresist mask.

The first hard mask can be for example soluble polyimide or some similar type of material. The second hard mask can be for example $SiO_2$, $Si_3N_4$, $SiO_xN_y$, Ta, $Ta_2O_5$. Alternatively, the first hard mask material could comprise alumina ($Al_2O_3$) and the second hard mask could comprise Ti. The first material removal process can comprise a reactive ion etch performed in a Fluorine based atmosphere, such as for example $CF_4$, CHF3. The second material removal process could comprise a reactive ion etch performed in an oxygen containing atmosphere such as $CO_2$ or $O_2$.

A fourth material removal process could be performed at an angle relative to a normal to the surface of the deposited layers in order to form the write pole with a desired trapezoidal shape.

After the material removal process has been performed a fill material such as alumina can be deposited to encapsulate the write pole to offer mechanical strength, minimize corrosion due to exposure to ambient condition, and assist in CMP to remove re-deposition and fencing. A lift off procedure can be performed such by using a solvent solution to assist in removing the hard mask, photoresist layers, and unwanted fill material prior to CMP. It should be pointed out that the process described above allows the first hard mask to be deposited much thicker than the second hard mask. Furthermore, the first hard mask can be constructed of a material that can be easily removed by the lift off solution. Since the first hard mask layer can be made thick, this provides substantial side wall surface area with which the lift off solution can react, greatly facilitating the lift off process.

After refill and lift off process has been performed, a chemical mechanical polishing (CMP) process can be performed to form to shear off the refill material, photoresist mask, second and first hard masks on top of the write pole to form a planar upper surface. A (CMP) stop layer, such as diamond like carbon, can be deposited prior to depositing the hard mask layers, in order to provide a well defined end point for the CMP process.

BRIEF DESCRIPTION OF THE DRAWINGS

For a fuller understanding of the nature and advantages of this invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out this invention. This description is made for the purpose of illustrating the general principles of this invention and is not meant to limit the inventive concepts claimed herein.

Figure 1:
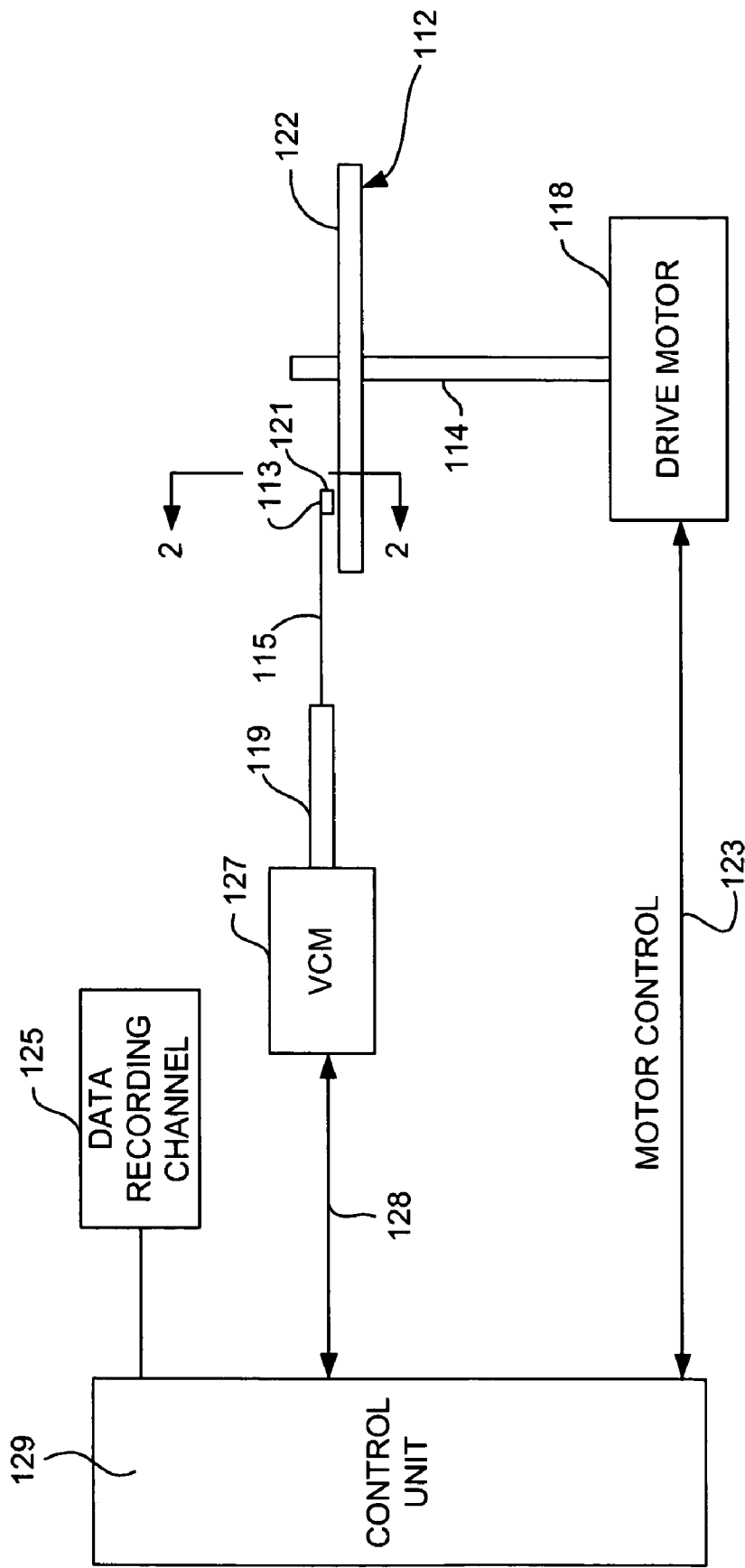
FIG. 1 is a schematic view of a magnetic storage system in which the present invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of an annular pattern of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 is moved radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
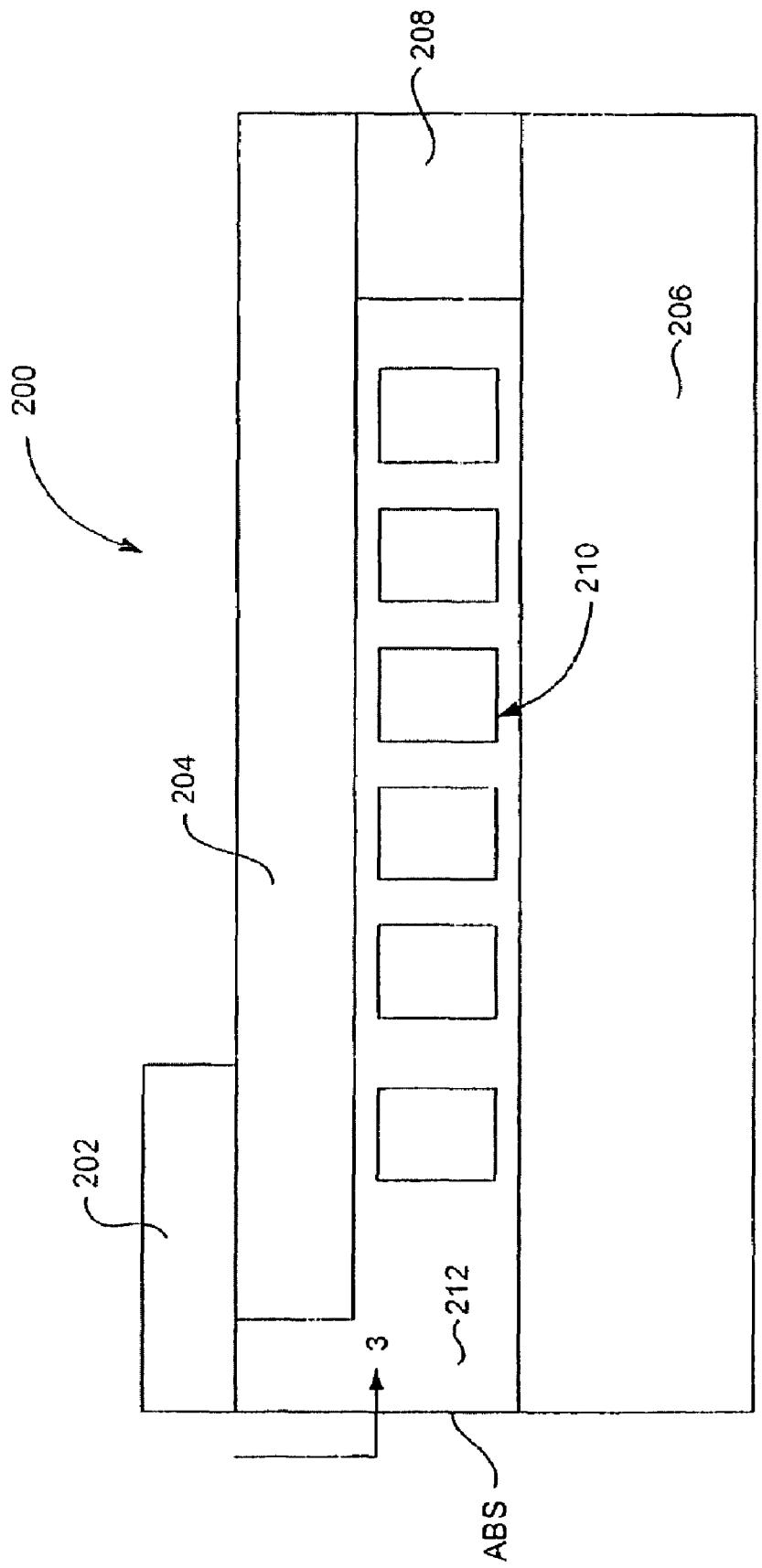
FIG. 2 is a cross sectional view of a perpendicular magnetic write element according to an embodiment of the present invention.

With reference to FIG. 2. a side cross section of magnetic element 200 for perpendicular recording can be seen. The write head includes a write pole 202 formed upon a flux guide layer 204. The write pole 202 and flux guide layer 204 are both constructed of magnetic materials. The write pole 202 is designed to contain a very large concentration of magnetic flux, and therefore, is preferably constructed of laminated layers (not shown) of high magnetic moment, high magnetic saturation (high Bsat) material such as CoFe. These magnetic layers are preferably separated by very thin layers of non-magnetic material such as chromium (Cr) and nickel chromium (CrNi) also not shown. The shaping layer 204 being much wider than the write pole (into the plane of the page) need not accommodate as high a magnetic flux concentration as the write pole 202 and can be constructed of for example NiFe or iron containing alloys.

The write element 200 also includes a return pole 206 which is magnetically connected with the shaping layer 204 by a magnetic back gap layer 208. The return pole and back gap layer can be constructed of a magnetic material such as for example NiFe iron containing alloys. An electrically conductive coil 210, formed of for example Cu passes between the shaping layer 204 and the return pole, being insulated there from by non-magnetic, electrically insulating fill material 212. Only a portion of the coil 210 is shown in FIG. 2 and is shown in cross section. Although not shown, the coil would wrap around the back gap 208. The non-magnetic, electrically non-conductive material 212 extends upward to separate the shaping layer 204 a desired distance from the ABS surface. As will be understood by those skilled in the art, the non-magnetic, electrically conductive fill material could be formed in several layers, and one or more chemical mechanical polishing processes may be performed between the deposition of each layer. In fact the fill 212 could be formed of layers of different materials such as for example, $Al_2O_3$, $SiO_2$ and photoresist.

Figure 3:
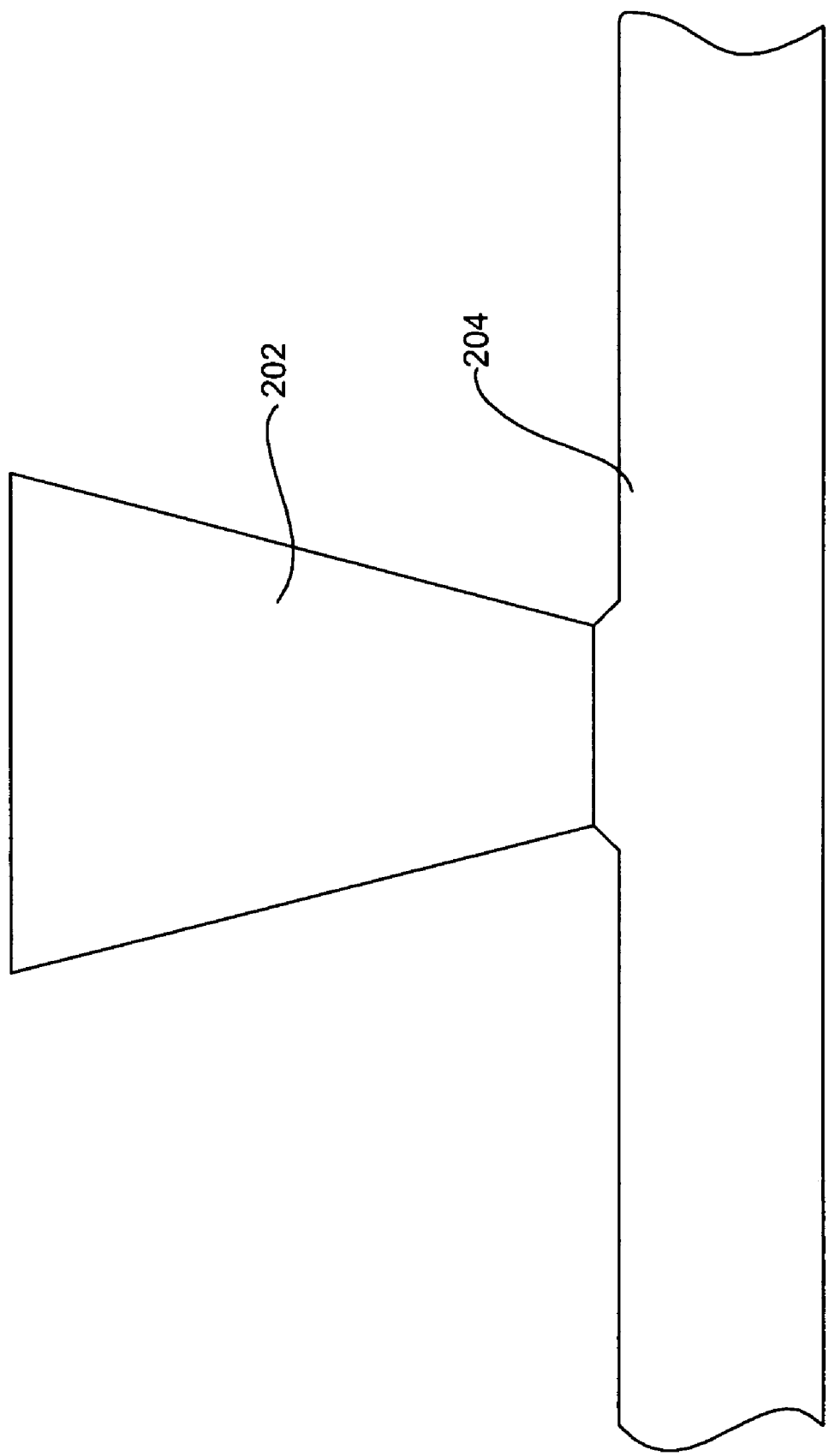
FIG. 3 is an ABS view, taken from line 3-3 of FIG. 2. illustrating a trapezoidal configuration of a write pole.

With reference now to FIG. 3, an ABS view of the write pole 202 shows the desired trapezoidal shape of the write pole, being wider at the top and tapering narrower at the bottom. FIG. 3, also shows the flux guide layer 204 for purposes of illustration. However, in actuality the flux guide layer would be recessed and disposed behind the fill material 212.

Figure 4:
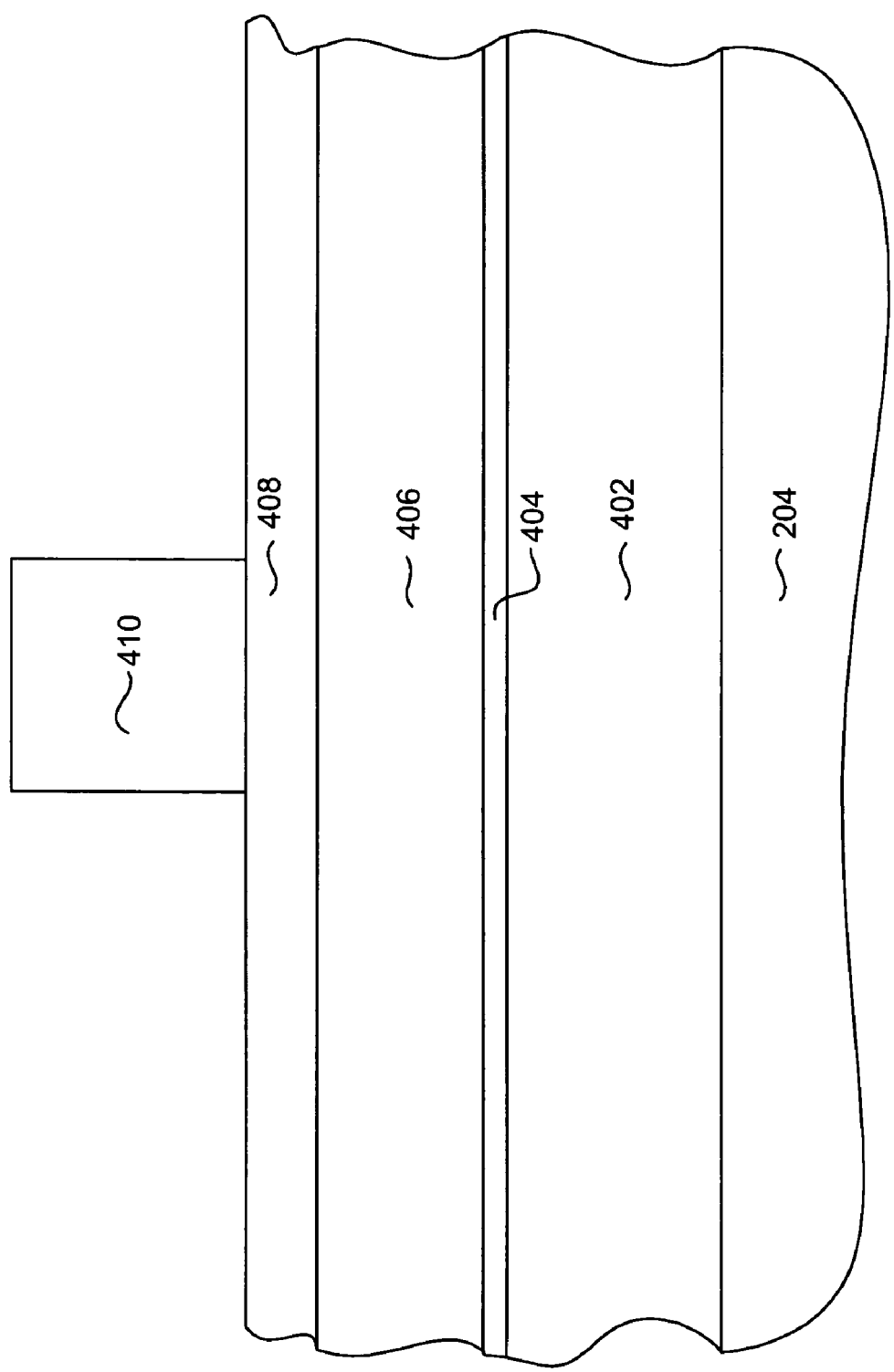
FIG. 4-11 illustrates a method of constructing a write element as in FIGS. 2 and 3 by showing views of a write pole in various intermediate stages of manufacture.

With reference now to FIGS. 4-8, a process for constructing a narrow track width write pole 202 will be described. With particular reference to FIG. 4, the flux guide layer 204 is constructed according to processes familiar to those skilled in the art, such as frame plating, and can be constructed of a magnetic material such as NiFe. On top of the shaping layer 202, a layer of high magnetic moment, high Bsat material 402 is deposited. The magnetic material 402 is preferably formed as multiple laminated layers of high magnetic moment, high Bsat material such as CoFe separated by very thin layers of nonmagnetic material such as chromium (Cr) and nickel chromium (CrNi). The formation of such a material will be familiar to those skilled in the art and may comprise the alternating sputter deposition of chromium and nickel chromium and CoFe.

With continued reference to FIG. 4 a layer of physically hard CMP stop material 404 is deposited, preferably by sputtering. The CMP stop material may be for example diamond like carbon (DLC). Thereafter, a layer of first hard mask material 406 is deposited. The first hard mask material 406 is preferably a soluble polyimide film, which is sold by sold by Arch Chemicals, Inc. under the trade name DURAMID®. A second hard mask 408 is thereafter deposited above the first hard mask 406. The second hard mask could be constructed of for example $SiO_2$ or some similar material. In an alternate embodiment, the first hard mask 406 could be constructed of alumina ($Al_2O_3$) and the second hard mask 408 could be constructed of Ti.

After depositing the second hard mask layer 408 a layer of photoresist is spun on and patterned using photolithographic procedures familiar to those skilled in the art to produce a photoresist mask 410 having a width for defining a trackwidth of the sensor. Although examples of materials for the first and second hard mask layers 406, 408 have been described, those are only by way of example. More importantly, the second hard mask material 406 should be constructed of a material that is more readily removed by a first material removal process (an example of which will be described herein below) than is the photoresist mask. In a similar manner, the first hard mask material 406 should be selected of a material that will be removed at a faster rate than the second hard mask 408 when subjected to a second material removal process.

Figure 5:
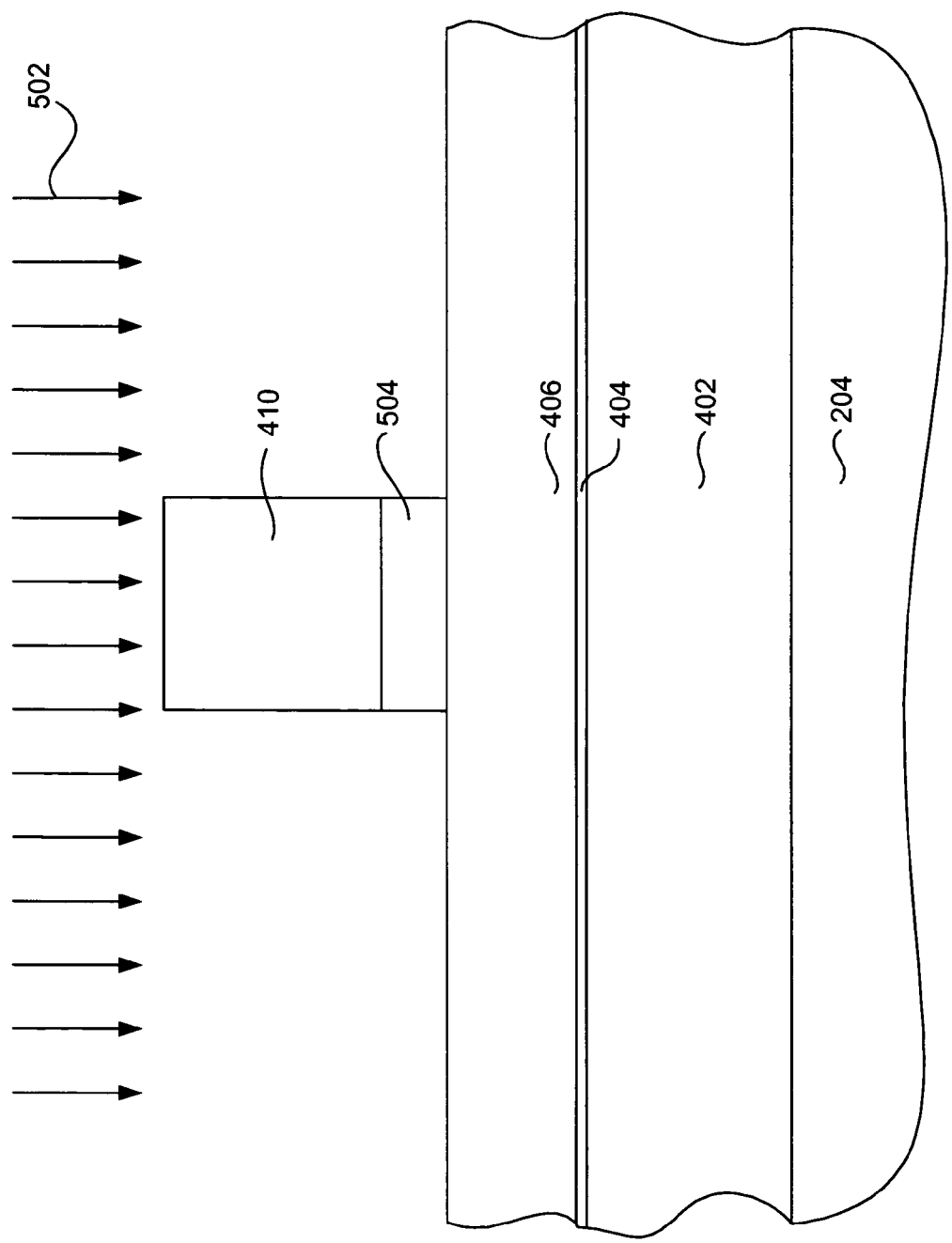

With reference now to FIG. 5, with the photorsesist mask 410 formed, a first material removal process 502 is performed. While the first material removal process could be one of several such processes, it preferably includes a reactive etch performed in a fluorine containing atmosphere, such as $CF_4$ and/or $CHF_3$. The first material removal process patterns the photoresist mask 410 onto the hard mask material layer, removing exposed portions of the second hard mask material layer 408 leaving a second hard mask 504.

Figure 6:
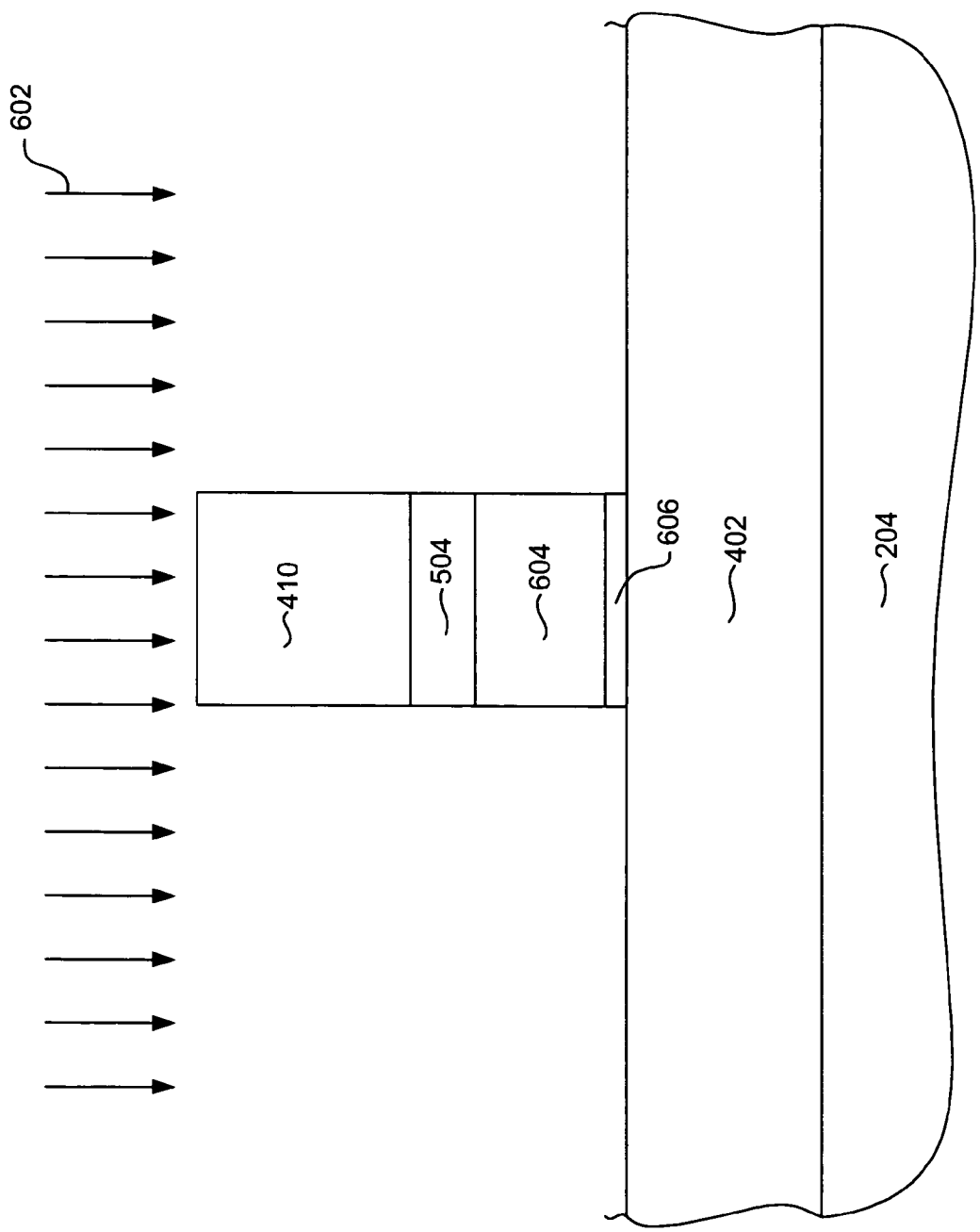

With reference now to FIG. 6, a second material removal process 602 is performed. The second material removal process 602 could include a reactive ion etch using an oxygen based atmosphere such as $O_2$ or $CO_2$. The second material removal process 602 removes portions of the first hard mask material layer 406 and the CMP stop layer material 404 that are not covered by the second hard mask 504 and photoresist mask 410 producing a first hard mask 604 and CMP stop layer 606.

Figure 7:
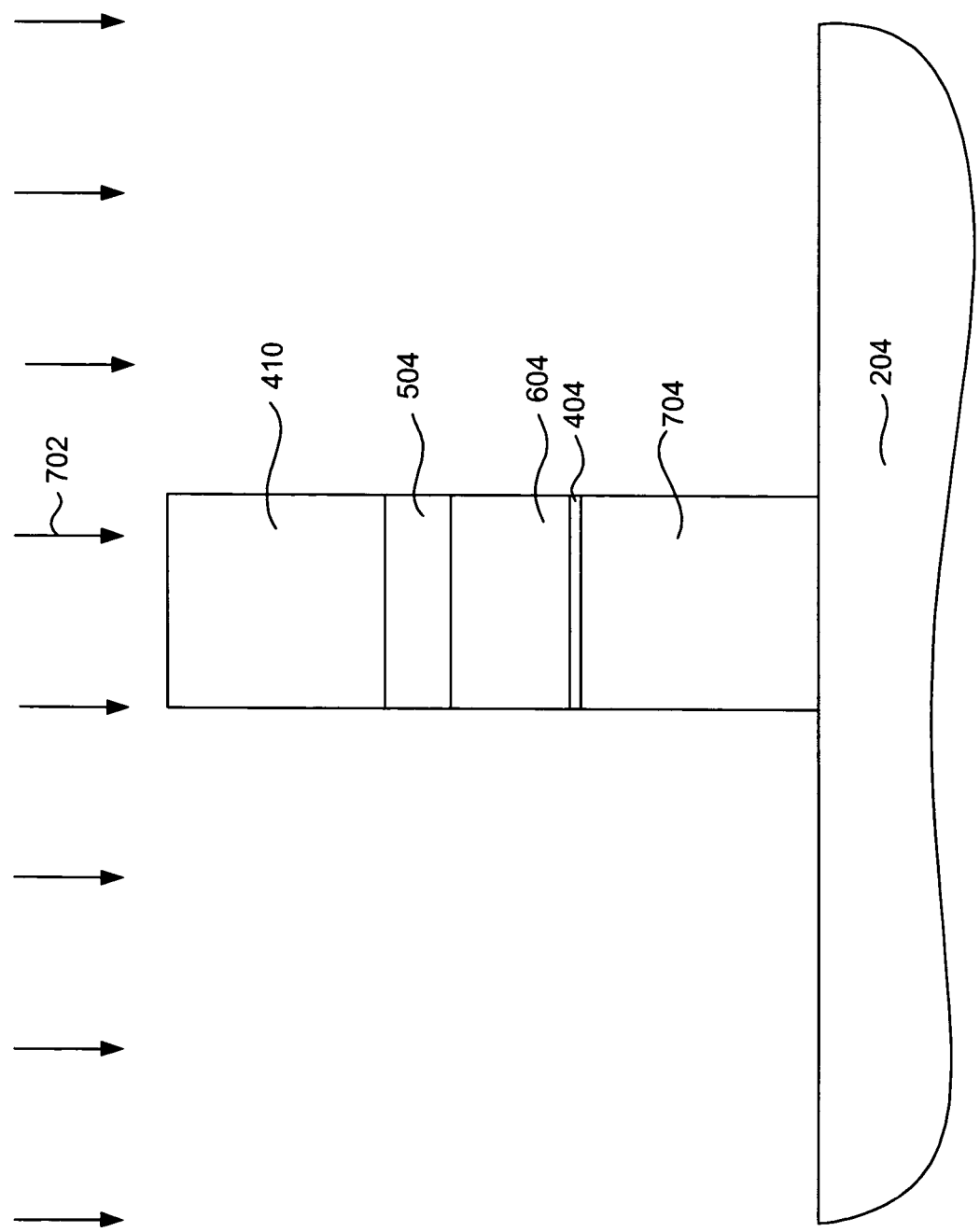

Thereafter, with reference to FIG. 7, a third material removal process 702 is performed to remove portions of the magnetic layer 402 not covered by the hard masks 604, 504, 404, and photoresist mask 410. The third material removal is preferably an ion milling process performed in a direction normal to the upper surface of the magnetic layer 402 (i.e. straight down) as indicated by arrows 702. This ion milling results in a write pole 704 having substantially vertical side walls.

Figure 8:
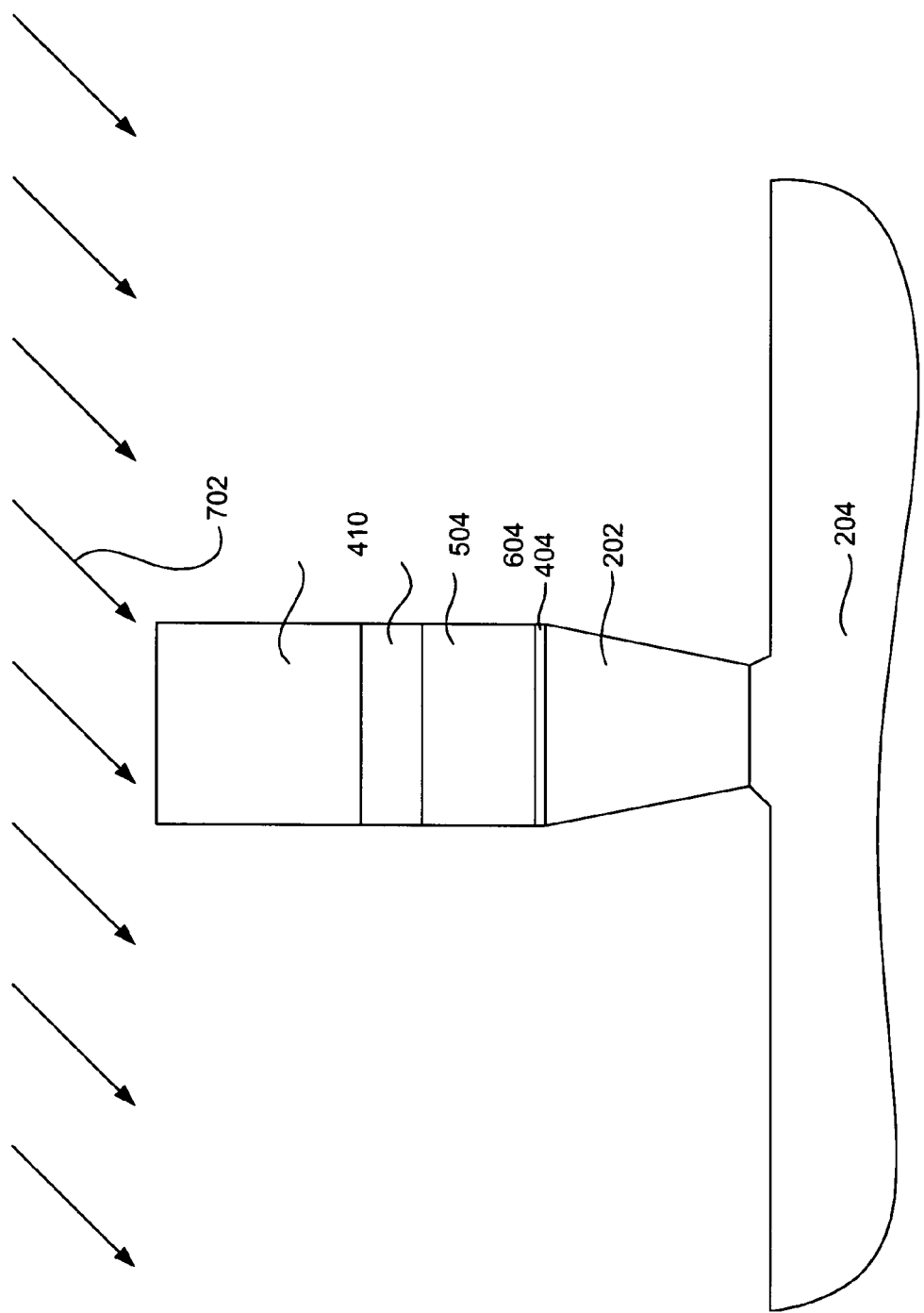

With reference now to FIG. 8, in order to form the write pole with the desired trapezoidal shape as fourth material removal process can be performed at an angle relative to a normal to the upper surface of the magnetic layer 402. The fourth material removal process is preferably an ion milling operation performed at an angle 30 to 60 degrees relative to normal.

Figure 9:
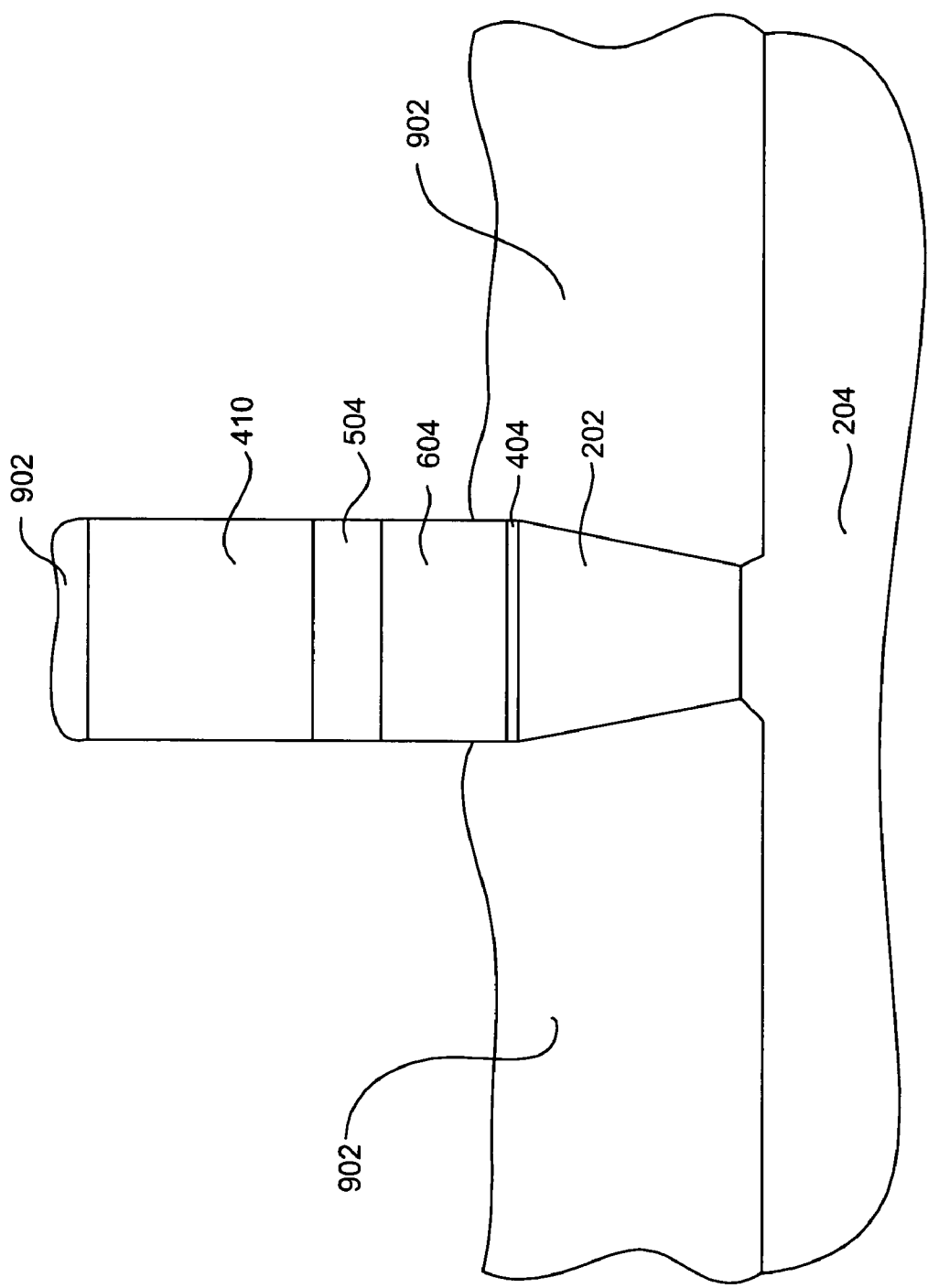

With reference now to FIG. 9, after forming the write pole 202 with the appropriate trapezoidal shape, a layer of dielectric material 902 is deposited. The dielectric material can be for example alumina $Al_2O_3$ or some other dielectric, non-magnetic material. The dielectric material is deposited to extend above the top of the write pole 202.

Figure 10:
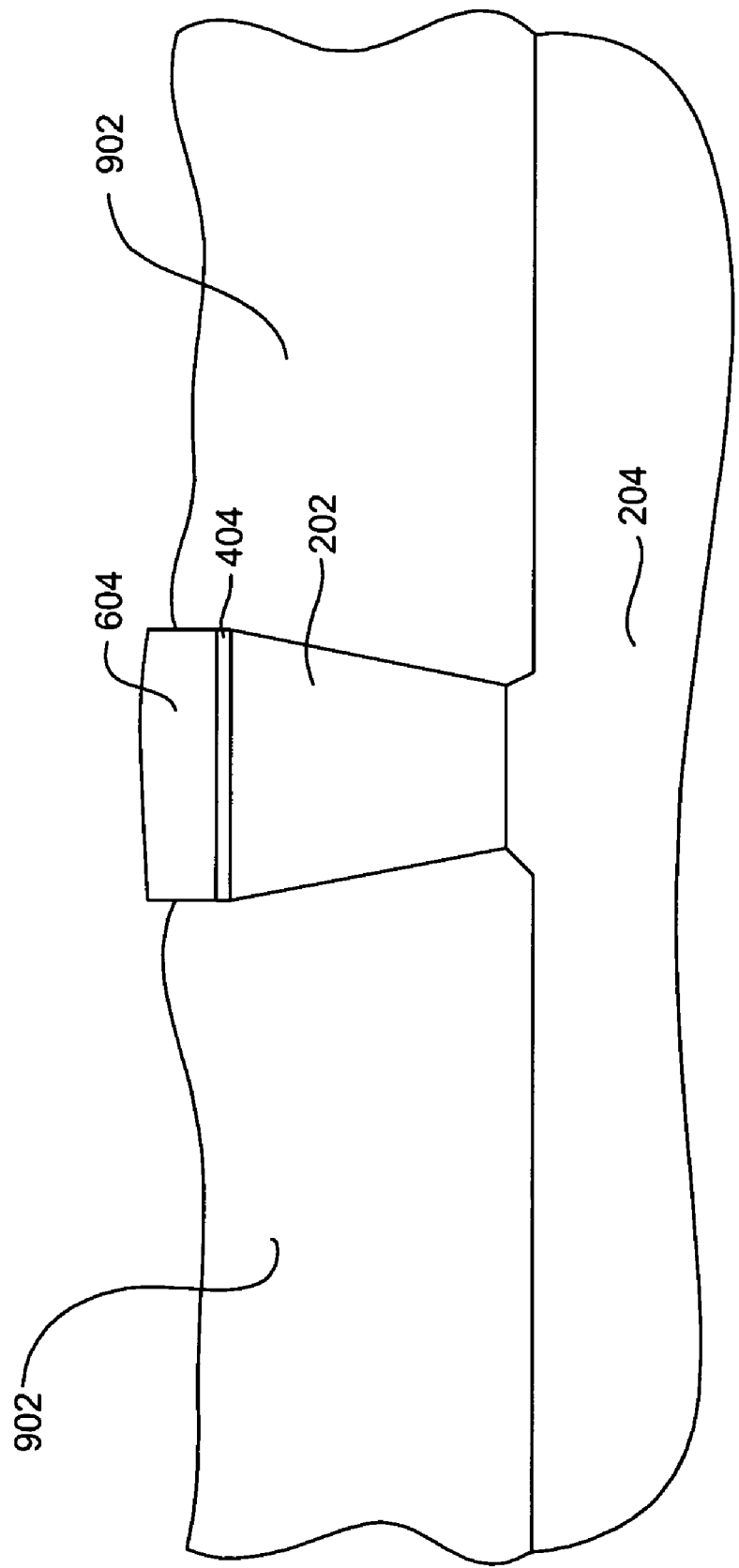

With reference to FIGS. 9 and 10, the first and second hard mask layers 604, 504 and photoresist mask 410 are lifted off. The mask layers 604, 504, 410 are preferably lifted off using a hot NMP (N-methyl pyrrolidone) solution. The first mask is preferably constructed of a material (such as Duramid®) that is readily dissolved in such a lift off solution. The use of a bilayer hard mask structure 604, 504 allows the first hard mask 604 to be constructed much thicker than the second hard mask 504. The more substantial side walls of the thicker first hard mask layer 604 provide more surface with which the lift off solution can react and therefore facilitates lift off.

Figure 11:
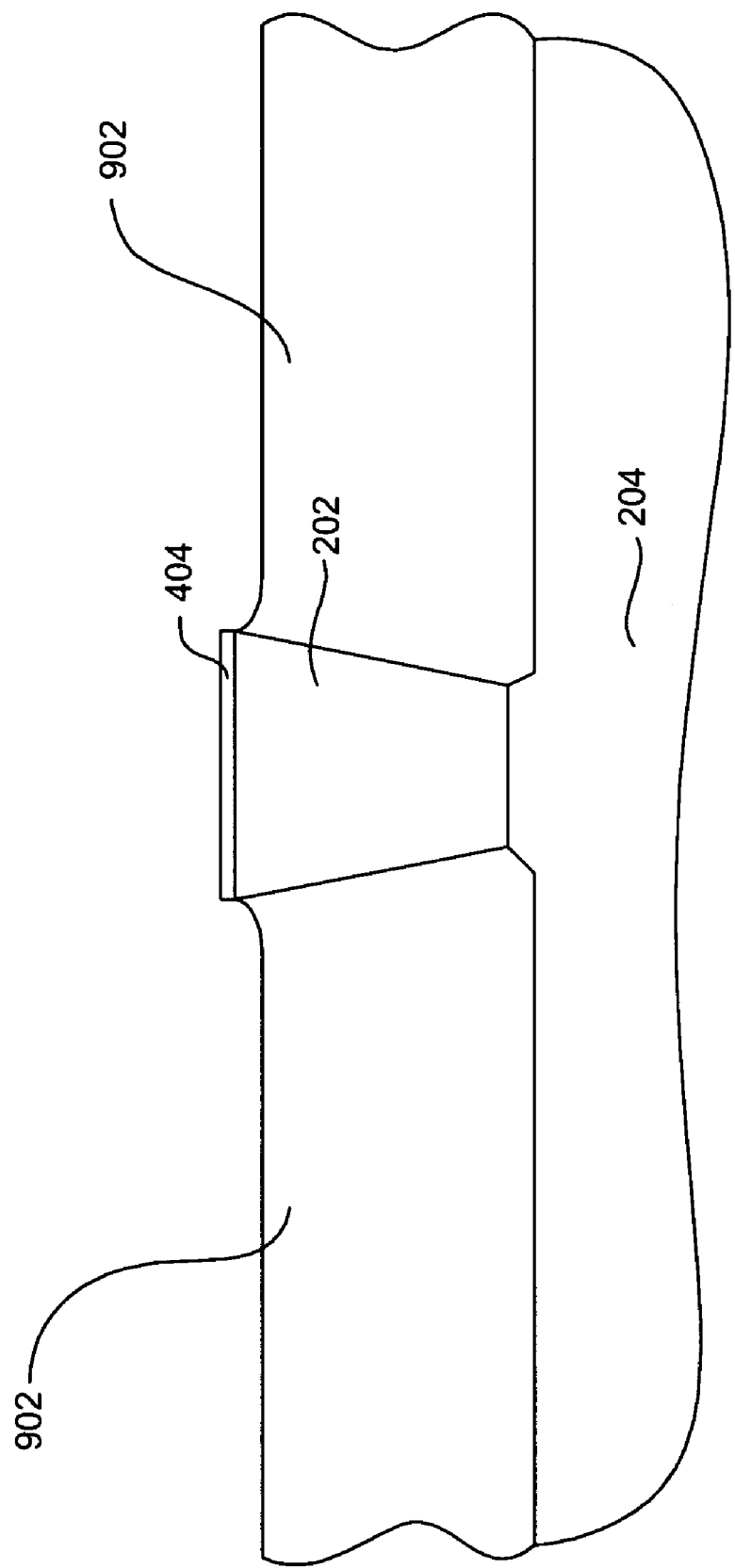

With reference now to FIG. 11, a chemical mechanical polishing process can be performed to planarize the upper surface of the dielectric layer 902. Using the CMP stop layer 404 to determine the end point of the CMP process creates a planar surface 1102 that is coplanar with the upper surface of the CMP stop layer 404.

Further manufacturing steps will be familiar to those skilled in the art, and may include for example, the deposition of additional insulation layers (not shown) and/or the construction of a trailing shield (also not shown). While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for manufacturing a magnetic structure of a write head,
   comprising:
   forming a magnetic layer;
   depositing a first hard mask, the first hard mask comprising alumina;
   depositing a second hard mask on said first hard mask, the second hard mask comprising Ti;
   forming a photoresist mask on said second hard mask;
   performing a first material removal process to remove portions of said second hard mask not covered by said photoresist mask;
   performing a second material removal process to remove portions of said first hard mask not covered by said second hard mask and said photoresist mask; and
   performing a third material removal process to remove portions of said magnetic material not covered by said first and second hard masks, thereby manufacturing the magnetic structure of a write head.

2. A method as in claim 1, wherein said second hard mask layer is more readily removed by said first material removal process than said photoresist mask is.

3. A method as in claim 1, wherein said first hard mask is more readily removed by said second material removal process than said second hard mask is 4. A method as in claim 1 wherein said magnetic material comprises CoFe.

5. A method as in claim 1 wherein said second material removal process comprises a reactive ion etch performed in an atmosphere comprising $O_2$.

6. A method as in claim 1 wherein said second material removal process comprises a reactive ion etch performed in an atmosphere comprising $CO_2$.

7. A method as in claim 1 wherein said second material removal process comprises a reactive ion etch performed in an atmosphere comprising $O_2$.

8. A method as in claim 1 wherein said first hard mask is deposited thicker than said second hard mask.

9. A method as in claim 1 further comprising after forming said magnetic layer and before depositing said first hard mask, depositing a layer comprising diamond like carbon.

10. A method as in claim 1 further comprising, lifting off said photoresist mask using hot NMP.

11. A method as in claim 1 further comprising performing a chemicalmechanical polishing process.

12. A method as in claim 1 wherein said third material removal process comprises ion milling.

13. A method as in claim 1, further comprising, performing a fourth material removal process at an angle to a normal to said magnetic layer to form said magnetic layer with a trapezoidal cross section.

14. A method as in claim 13 wherein said fourth material removal process comprises ion milling performed at an angle of less than 90 degrees with respect to a normal to a surface of said magnetic layer.

15. A method as in claim 13 wherein said third and fourth material removal processes comprise a common material removal process performed at varying angles.

16. A method for manufacturing a magnetic structure of a write head,
   comprising:
   forming a magnetic layer;
   depositing a first hard mask;
   depositing a second hard mask on said first hard mask;
   forming a photoresist mask on said second hard mask;
   performing a first material removal process to remove portions of said second hard mask not covered by said photoresist mask;
   performing a second material removal process to remove portions of said first hard mask not covered by said second hard mask and said photoresist mask; and
   performing a third material removal process to remove portions of said magnetic material not covered by said first and second hard masks, thereby manufacturing the magnetic structure of a write head;
   wherein said first hard mask comprises a soluble polyimide film and said second hard mask comprises $SiO_2$.

17. A method for manufacturing a magnetic structure of a write head,
   comprising:
   forming a magnetic layer;
   depositing a first hard mask;
   depositing a second hard mask on said first hard mask;
   forming a photoresist mask on said second hard mask;
   performing a first material removal process to remove portions of said second hard mask not covered by said photoresist mask;
   performing a second material removal process to remove portions of said first hard mask not covered by said second hard mask and said photoresist mask; and
   performing a third material removal process to remove portions of said magnetic material not covered by said first and second hard masks, thereby manufacturing the magnetic structure of a write head;
   wherein said first material removal process comprises a reactive ion etch performed in an atmosphere comprising Fluorine.

18. A method for manufacturing a magnetic structure of a write head,
   comprising:
   forming a magnetic layer;
   depositing a first hard mask;
   depositing a second hard mask on said first hard mask;
   forming a photoresist mask on said second hard mask;
   performing a first material removal process to remove portions of said second hard mask not covered by said photoresist mask;
   performing a second material removal process to remove portions of said first hard mask not covered by said second hard mask and said photoresist mask; and performing a third material removal process to remove portions of said magnetic material not covered by said first and second hard masks, thereby manufacturing the magnetic structure of a write head;

wherein said first material removal process comprises reactive ion etching performed in an atmosphere comprising $CF_4$.

19. A method for manufacturing a magnetic structure of a write head, comprising:

forming a magnetic layer;

depositing a first hard mask;

depositing a second hard mask on said first hard mask;

forming a photoresist mask on said second hard mask;

performing a first material removal process to remove portions of said second hard mask not covered by said photoresist mask;

performing a second material removal process to remove portions of said first hard mask not covered by said second hard mask and said photoresist mask; and performing a third material removal process to remove portions of said magnetic material not covered by said first and second hard masks, thereby manufacturing the magnetic structure of a write head;

wherein said first material removal process comprises reactive ion etching performed in an atmosphere comprising $CF_3$.

* * * * *